(12) United States Patent
Noda et al.

(10) Patent No.: US 12,313,191 B2
(45) Date of Patent: May 27, 2025

(54) HEAT SHRINK TUBE AND METHOD FOR FORMING SAME

(71) Applicants: NISSEI ELECTRIC CO., LTD., Hamamatsu (JP); CHEMOURS-MITSUI FLUOROPRODUCTS CO., LTD., Tokyo (JP)

(72) Inventors: Mineyuki Noda, Shizuoka (JP); Hiromasa Yabe, Shizuoka (JP); Hideki Kikuchi, Hamamatsu (JP); Kei Miyamoto, Hamamatsu (JP); Kota Suzuki, Hamamatsu (JP)

(73) Assignees: NISSEI ELECTRIC CO., LTD., Hamamatsu (JP); CHEMOURS-MITSUI FLUOROPRODUCTS CO., LTD., Tokyo (JP)

( * ) Notice: Subject to any disclaimer, the term of this patent is extended or adjusted under 35 U.S.C. 154(b) by 514 days.

(21) Appl. No.: 17/638,299

(22) PCT Filed: Aug. 26, 2020

(86) PCT No.: PCT/JP2020/032161
§ 371 (c)(1),
(2) Date: Feb. 25, 2022

(87) PCT Pub. No.: WO2021/039837
PCT Pub. Date: Mar. 4, 2021

(65) Prior Publication Data
US 2022/0349500 A1 Nov. 3, 2022

(30) Foreign Application Priority Data
Aug. 30, 2019 (JP) .................................. 2019-158783

(51) Int. Cl.
*B29C 48/09* (2019.01)
*B29C 48/88* (2019.01)
(Continued)

(52) U.S. Cl.
CPC .............. *F16L 11/12* (2013.01); *B29C 48/09* (2019.02); *B29C 48/9115* (2019.02);
(Continued)

(58) Field of Classification Search
CPC ....... B29C 48/88; B29C 48/89; B29C 48/902; B29C 48/912; B29C 48/9125;
(Continued)

(56) References Cited

U.S. PATENT DOCUMENTS

| 4,510,300 A * | 4/1985 | Levy ......................... C08J 5/18 |
| | | 264/235 |
| 8,097,314 B2 * | 1/2012 | Kurokawa ............ B29C 48/902 |
| | | 264/209.3 |

(Continued)

FOREIGN PATENT DOCUMENTS

| CN | 105216276 A | 1/2016 |
| CN | 208468991 U | 2/2019 |

(Continued)

OTHER PUBLICATIONS

Extended European Search Report dated Oct. 31, 2022, issued by the European Patent Office in corresponding European Application No. 20859022.4 (6 pages).

(Continued)

*Primary Examiner* — Michael C Romanowski
(74) *Attorney, Agent, or Firm* — BUCHANAN INGERSOLL & ROONEY PC

(57) ABSTRACT

Described is a peelable heat shrink tube composed of a fluororesin and having a determination coefficient calculated
(Continued)

from [Equation 1] below using an elastic modulus ratio (%) of more than 0, but 0.90 or less:

$$\text{Determination coefficient} = (\text{correlation coefficient})^2 = \left[\frac{(\text{covariance})}{(\text{standard deviation of } X)(\text{standard deviation of } Y)}\right]^2 \quad [\text{Equation 1}]$$

where X, Y and covariance represent the following:
  X: Proportion of the position of each point, where the elastic modulus was measured, from the interior of the tube
  Y: Elastic modulus ratio in each region
  Covariance: Average of the product of deviations of X and Y.

12 Claims, 2 Drawing Sheets

(51) Int. Cl.
| | |
|---|---|
| *B29C 61/02* | (2006.01) |
| *B29K 27/00* | (2006.01) |
| *B29K 27/18* | (2006.01) |
| *B29L 23/00* | (2006.01) |
| *B32B 7/028* | (2019.01) |
| *F16L 11/12* | (2006.01) |
| *F16L 47/22* | (2006.01) |
| *H01R 4/72* | (2006.01) |
| *H02G 15/18* | (2006.01) |

(52) U.S. Cl.
CPC ............ *B29C 61/025* (2013.01); *F16L 47/22* (2013.01); *B29K 2027/16* (2013.01); *B29K 2027/18* (2013.01); *B29K 2995/0035* (2013.01); *B29K 2995/0098* (2013.01); *B29L 2023/001* (2013.01); *B29L 2023/005* (2013.01); *B32B 7/028* (2019.01); *B32B 2307/736* (2013.01); *H01R 4/72* (2013.01); *H02G 15/1806* (2013.01)

(58) Field of Classification Search
CPC ...... B29C 48/9185; B29K 2027/12–18; B32B 27/304; B32B 27/322; B32B 1/08
See application file for complete search history.

(56) References Cited

U.S. PATENT DOCUMENTS

| | | | | |
|---|---|---|---|---|
| 9,370,908 | B1* | 6/2016 | Chapman | B29C 55/24 |
| 10,898,616 | B1* | 1/2021 | Chen | B29C 66/40 |
| 2003/0082324 | A1* | 5/2003 | Sogard | A61L 31/048 |
| | | | | 264/209.3 |
| 2007/0231523 | A1* | 10/2007 | Ohmi | B32B 27/322 |
| | | | | 428/36.9 |
| 2008/0199646 | A1* | 8/2008 | Barnes | C23C 24/00 |
| | | | | 264/209.1 |
| 2008/0248226 | A1* | 10/2008 | Simon | B32B 25/08 |
| | | | | 428/34.9 |
| 2009/0107521 | A1* | 4/2009 | Ohmi | H01L 21/6708 |
| | | | | 134/198 |
| 2010/0119642 | A1 | 5/2010 | Ohmi | |
| 2010/0119754 | A1 | 5/2010 | Kurokawa | |
| 2010/0197861 | A1* | 8/2010 | Nishio | C08J 3/005 |
| | | | | 525/200 |
| 2012/0298250 | A1* | 11/2012 | Fukumoto | B29C 55/28 |
| | | | | 425/149 |
| 2013/0046058 | A1* | 2/2013 | Pham | C08F 214/262 |
| | | | | 264/239 |
| 2014/0255633 | A1* | 9/2014 | Suzuki | A61L 29/085 |
| | | | | 428/35.1 |
| 2015/0352319 | A1* | 12/2015 | Roof | B65B 53/02 |
| | | | | 156/86 |
| 2015/0354732 | A1* | 12/2015 | Roof | B29C 66/40 |
| | | | | 264/209.1 |
| 2016/0222145 | A1 | 8/2016 | Suzuki et al. | |
| 2016/0317716 | A1 | 11/2016 | Suzuki et al. | |
| 2017/0058115 | A1 | 3/2017 | Suzuki et al. | |
| 2018/0186062 | A1* | 7/2018 | Kikuchi | A61L 29/049 |
| 2021/0023756 | A1* | 1/2021 | Higuchi | B29C 48/307 |

FOREIGN PATENT DOCUMENTS

| | | | | |
|---|---|---|---|---|
| GB | 1280 172 | A | 7/1972 | |
| GB | 1280172 | * | 7/1972 | ............. F16L 11/04 |
| JP | H0343215 | A | 2/1991 | |
| JP | 2008-238664 | A | 10/2008 | |
| JP | 2010-125634 | A | 6/2010 | |
| JP | 4968823 | B2 | 7/2012 | |
| JP | 5518268 | B2 | 6/2014 | |
| JP | 2014129883 | A | 7/2014 | |
| JP | 2017044335 | A | 3/2017 | |
| JP | 2019130880 | A | * 8/2019 | |
| WO | WO-2007032425 | A1 | * 3/2007 | ............. B29C 48/09 |
| WO | 2008143035 | A1 | 11/2008 | |
| WO | 2016204174 | A1 | 12/2016 | |

OTHER PUBLICATIONS

"Plastic Molding Techniques and Mold Design", published by National Defense Industry Press, pp. 272-274, Feb. 29, 2008 (1st Edition).

"Technologies for Profile Extrusion and Composite Extrusion of Plastics and Product Development", published by Chemical Industry Press, pp. 390-392, Oct. 31, 1987 (1st Edition).

Office Action issued on Mar. 16, 2024 by The State Intellectual Property Office of People's Republic of China in corresponding Chinese Patent Application No. 202080060932.9, w/English translation of Office Action (25 pgs).

International Search Report (PCT/ISA/210) with an English translation, and Written Opinion (PCT/ISA/237) mailed on Oct. 27, 2020, by the Japanese Patent Office as the International Searching Authority for International Application No. PCT/JP2020/032161.

* cited by examiner

HEAT SHRINK TUBE AND METHOD FOR FORMING SAME

TECHNICAL FIELD

This invention relates to a heat shrink tube comprising a fluororesin, excelling in peelability, and having a high thermal (heat) shrinkage rate and high transparency.

BACKGROUND ART

Fluororesins are superior to other plastics, for example, in chemical stability, heat resistance, and mold release characteristics. Thus, heat shrink tubes made of fluororesins are used as protective and insulating heat shrink tubes in various fields including foods, medicine, pharmaceutics, chemistry, and analytical instruments.

Among uses as general heat shrink tubes for protective and insulating purposes are uses involving processing of products in which the heat shrink tube is once shrink-coated, if required, and then only the heat shrink tube is peeled off. They include, for example, uses in which electric wires, tubes, etc. having a multilayer structure including a protective layer for a blade or the like, or having a heteromorphic structure, are shrink-coated with the heat shrink tube, and the interior members are molded or heat-welded, whereafter the heat shrink tube is removed.

In addition to the excellent properties characteristic of fluororesins, the excellent property of the tube being easily peeled and strippable by hand, namely, peelability, is required of such uses.

Patent Document 1 describes a peelable tube comprising a mixture of a plurality of thermoplastic fluororesins containing different types of fluororesins.

Patent Document 2 and Patent Document 3 show heat shrink tubes having peelability. These documents describe that fluororesins used therein are characterized by fulfilling the change amount of loss energy as specially defined; comprising a mixture of a plurality of fluororesins of different types; and containing a fluororesin accounting for a main proportion in the mixture (i.e., a main fluororesin), the main fluororesin being a polymer composed of at least three types of monomers, the polymer being a copolymer containing at least tetrafluoroethylene (TFE) and hexafluoropropylene (HFP) as its constituent monomers.

The heat shrink tubes of Patent Documents 2 and 3, however, tend to be excellent in peelability, but are decreased in shrinkage rate, as the amounts added of the fluororesins other than the main fluororesin increase. Depending on the uses they are put to, therefore, the amount of their heat shrinkage is insufficient, and they fail to play the roles of heat shrink tubes, so that further improvements are required of them.

The present inventors have also found that the heat shrink tubes described in Patent Documents 1 to 3 show a tendency toward better peelability with increases in the amounts of the other fluororesins added, but pose the problem of aggravated transparency such that they become cloudy, making it difficult to confirm the state of the underlying material through the heat-shrunk tube.

PRIOR ART DOCUMENTS

Patent Documents

Patent Document 1: Japanese Patent No. 4968823
Patent Document 2: Japanese Patent No. 5518268
Patent Document 3: JP-A-2014-129883

SUMMARY OF THE INVENTION

Problems to be Solved by the Invention

A challenge for the present invention is to provide a heat shrink tube having the peelability of the publicly known heat shrink tubes and, in addition, improved in heat shrinkage rate, and excellent in transparency as well.

Means for Solving the Problems

The present invention provides a peelable heat shrink tube composed of a fluororesin characterized in that a determination coefficient calculated from the following [Equation 1] using an elastic modulus ratio (%) is more than 0.00, but 0.90 or less, the elastic modulus ratio (%) being obtained by measuring, on a straight line passing through regions (A), (B) and (C) below, the elastic moduli of at least three points freely selected from each region, provided that the wall thickness of the tube at a cross-section perpendicular to the extrusion direction of the tube is 100%, the elastic modulus ratio (%) being the ratio of the average value of the elastic moduli in each region and the average value of the elastic moduli in all the regions, (A) Region of less than 30% from the interior of the tube
(B) Region of 30% or more, but less than 70%, from the interior of the tube
(C) Region of 70% or more from the interior of the tube $$\text{Determination coefficient} = (\text{correlation coefficient})^2 = \left[\frac{(\text{covariance})}{(\text{standard deviation of } X)(\text{standard deviation of } Y)}\right]^2 \quad \text{[Equation 1]}$$

where X, Y and covariance represent the following:
X: Proportion of the position of each point, where the elastic modulus was measured, from the interior of the tube
Y: Elastic modulus ratio in each region
Covariance: Average of the product of deviations of X and Y The heat shrink tube having a peel strength of 10N or less is a preferred aspect of the present invention.

It is a preferred aspect of the present invention that the fluororesin is a copolymer melting at a temperature equal to or higher than a melting point to show fluidity, and is a copolymer of an unsaturated fluorinated hydrocarbon, an unsaturated fluorinated chlorinated hydrocarbon, or an ether group-containing unsaturated fluorinated hydrocarbon, or is at least one copolymer selected from copolymers of these unsaturated fluorinated hydrocarbons and ethylene.

It is also a preferred aspect of the present invention that the fluororesin is a copolymer of tetrafluoroethylene and at least one monomer selected from hexafluoropropylene, fluoroalkoxytrifluoroethylene, chlorotrifluoroethylene, vinylidene fluoride and vinyl fluoride, or is at least one copolymer selected from copolymers of these monomers and ethylene.

It is also a preferred aspect of the present invention that the fluororesin is at least one copolymer selected from tetrafluoroethylene-hexafluoropropylene copolymer (FEP), tetrafluoroethylene-perfluoroalkyl vinyl ether copolymer (PFA), tetrafluoroethylene-ethylene copolymer (ETFE), tetrafluoroethylene-hexafluoropropylene-vinylidene fluoride copolymer (THV), and polyvinylidene fluoride-polyvinylidene difluoride (PVDF).

The present invention also provides a heat shrink tube forming method, comprising subjecting a fluororesin to melt extrusion to form a heat shrink tube, wherein the melt extrusion is performed using a melt extruder equipped with a cooling rate reducing means for reducing the difference between the cooling rate of the inner peripheral surface of the tube being melt-extruded and the cooling rate of the outer peripheral surface of the tube.

It is a preferred aspect of the present invention that the cooling rate reducing means is provided with a mechanism for introducing at least one substance, selected from temperature controlled air, water, and a nitrogen gas, into the tube being melt-extruded by the melt extruder, so that at least one of temperature controlled air, water, and a nitrogen gas is introduced into the tube during melt extrusion.

Effects of the Invention

The heat shrink tube, and the method for producing it, according to the present invention, can be expected to show the following excellent effects:

The peel strength of the tube in the longitudinal direction is low. Thus, the tube need not be provided with a notch. Alternatively, the tube can be easily peeled by hand, with a notch measuring several millimeters or so as a starting point. Moreover, portions different in elastic modulus are present in the thickness direction of the tube. Thus, the tube is better in strength during diameter expansion than conventional tubes, so that rupture, cracking, burst or the like does not occur. As a result, a sufficient heat shrinkage rate can be ensured, with peelability stable over a continuous length being maintained. Consequently, a heat shrink tube excellent in both of peelability and heat shrinkage rate is obtained.

In addition, the heat shrinkage rate is 40% or more. Thus, clamping by the heat shrink tube is sufficiently ensured, a high work efficiency is obtained, and the tube can be put to any type of use.

Figure 1:
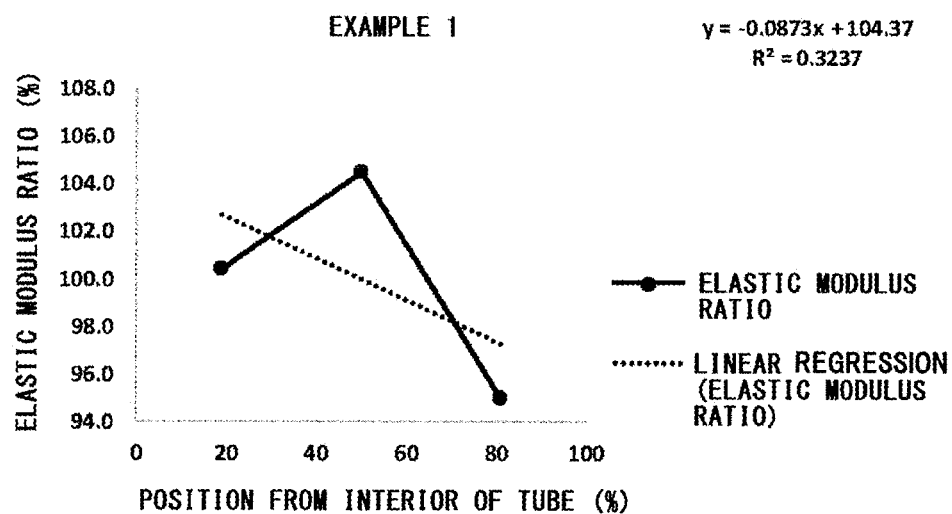
FIG. 1 is a view for finding a determination coefficient from the relation between the position (%) from the interior of a heat shrink tube, obtained in Example 1, and the elastic modulus ratio (%).

MODE FOR CARRYING OUT THE INVENTION (Heat Shrink Tube)

The peelable heat shrink tube of the present invention is obtained by melt-extruding a fluororesin. Its important feature is that a determination coefficient calculated from the aforementioned [Equation 1] using elastic moduli is more than 0.00, but 0.90 or less, the elastic moduli of optional points on a straight line connecting the optional points in the aforementioned regions (A), (B) and (C), provided that the wall thickness of the tube at a cross-section in the extrusion direction of the peelable heat shrink tube composed of the fluororesin is 100%, the straight line intersecting the regions (A), (B) and (C) perpendicularly at the optional points.

The determination coefficient of more than 0.00, but 0.90 or less, means that there are clear differences in hardness between the regions (A), (C) and the region (B) owing to differences in the cooling rate of the resin. That is, since harder portions are present, the strength of the heat shrink tube during its diameter expansion is improved. Thus, a greater expansion in diameter can be achieved, and a greater shrinkage rate can be obtained.

Moreover, the heat shrink tube of the present invention has a starting point for peeling, because it has portions clearly different in hardness. Thus, the tube without a notch, or having only a notch measuring several millimeters or so, can be peeled over a long distance by a smaller force.

Generally, the amount of deformation of a cross-section of a tube when peeled is small at a site with a high elastic modulus (hard site), and is large at a site with a low elastic modulus (soft site). In a tube having sites with high and low elastic moduli present alternately, therefore, the amount of deformation is different at the points where the elastic modulus changes, presenting a starting point for breakage. There, cracking is apt to occur, resulting in easy peeling. That is, as the difference in elastic modulus at the point of change in elastic modulus increases, stable peelability is maintained over a long length, and an improvement in peelability is achieved.

In a highly continuous tube, on the other hand, a cross-section of the tube gives a uniform or gradiently changed elastic modulus. In such a tube, the starting point for breakage occurs minimally. Thus, cracking occurs with difficulty, making it difficult to peel the tube stably over a long length.

The above peelability at the point of change in elastic modulus can be expressed using an elastic modulus obtained by nanoindentation measurement.

Concretely, peelability can be determined using a determination coefficient $R^2$ according to [Equation 1] which is calculated using an elastic modulus ratio (%) obtained by measuring, on a straight line passing through the aforementioned regions (A), (B) and (C), the elastic moduli of at least three points freely selected from each region, provided that the wall thickness of the tube at a cross-section perpendicular to the extrusion direction of the tube is 100%, the elastic modulus ratio (%) being the ratio of the average value of the elastic moduli in each region and the average value of the elastic moduli in all the regions. The determination coefficient $R^2$ represents the degree of correlation between the two parameters, i.e., the position (%) from the interior of the tube, and the ratio of the elastic modulus at each position. A determination coefficient $R^2$ in excess of 0.90 means that the elastic moduli in the regions (A), (B) and (C) change linearly. This is not preferred, because there is no starting point for breakage, and the tube is difficult to peel.

The heat shrink tube of the present invention preferably has a peel strength of 10N or less. With a peel strength of 10N or less, the tube can be easily peeled by hand, with a notch of the order of several millimeters as a starting point. The method of measuring the peel strength will be described later by Examples.

More preferably, the peel strength is 5N or less. The tube with a peel strength of 5N or less can be peeled by hand, without the use of a notch as a starting point. In this case, the work efficiency of an operation for removing the heat shrink tube is improved.

Examples of the fluororesin constituting the heat shrink tube of the present invention are copolymers melting at a temperature of a melting point or above to show fluidity, or compositions containing these copolymers. They include heat-fusible fluororesins, such as copolymers of unsaturated fluorinated hydrocarbons, unsaturated fluorinated chlorinated hydrocarbons, and ether group-containing unsaturated fluorinated hydrocarbons, etc., or copolymers of these unsaturated fluorinated hydrocarbons and ethylene.

Their concrete examples include copolymers of tetrafluoroethylene and at least one monomer selected from hexafluoropropylene (hereinafter called HFP), fluoroalkoxytrifluoroethylene (preferably, perfluoroalkyl vinyl ether (hereinafter called PAVE)), chlorotrifluoroethylene, vinylidene fluoride, and vinyl fluoride; or copolymers of these monomers with ethylene.

More concrete examples include tetrafluoroethylene-hexafluoropropylene copolymer (hereinafter, FEP), tetrafluoroethylene-perfluoroalkyl vinyl ether copolymer (hereinafter, PFA), tetrafluoroethylene-ethylene copolymer (hereinafter, ETFE), tetrafluoroethylene-hexafluoropropylene-vinylidene fluoride copolymer (hereinafter, THV), and polyvinylidene fluoride-polyvinylidene difluoride (hereinafter, PVDF).

Preferred examples of the heat-fusible fluororesin, from the viewpoint of transparency, include FEP composed of two monomers (TFE and HFP). Other examples are mixtures of FEP with different melting points, and mixtures of FEP and heat-fusible fluororesins different from FEP.

The heat-fusible fluororesins may be used alone, or may be mixtures of two or more of them. Also available are mixtures of at least two of the same type of copolymer different in the type of comonomer, comonomer content, molecular weight (weight average molecular weight or number average molecular weight), molecular weight distribution, melting point, melt flow rate (MFR), or the like, or different in mechanical properties. Their examples include mixtures of PFAs or FEPs. Such heat-fusible fluororesins can be produced by a publicly known method such as solution polymerization, emulsion polymerization, or suspension polymerization.

The melt flow rate (MFR) of the heat-fusible fluororesin is preferably 1 to 100 g/10 min, more preferably 1 to 80 g/10 min, and further preferably 1 to 50 g/10 min. The MFR is measured at a temperature of 372° C. under a load of 5 kg in accordance with ASTM D1238-95.

The melting point of the heat-fusible fluororesin is not limited, as long as it is within a range where a tube can be formed. However, it is 150° C. or higher, preferably in the range of 150 to 340° C.

The fluororesin for use in the present invention may be a mixture of a heat-fusible fluororesin and a polymer of tetrafluoroethylene (PTFE) having no melt formability. If a heat-fusible fluororesin and PTFE are used as the fluororesin of the present invention, the melting point of the heat-fusible fluororesin is lower than the melting point of PTFE and, for the purpose of preventing compatibilization, is preferably different greatly from the melting point of PTFE.

An example of the PTFE is a polymer of tetrafluoroethylene (TFE) alone, called a homopolymer of tetrafluoroethylene (PTFE), or a copolymer of tetrafluoroethylene containing 1% or less of a comonomer (i.e., modified PTFE). The melting point of the PTFE immediately after polymerization is 336 to 343° C., depending on the method of polymerization.

The polymerization method for the PTFE can be a publicly known method such as solution polymerization, emulsion polymerization, or suspension polymerization. The resulting PTFE is preferably a fine powder with an average particle size of 300 to 600 μm obtained by coagulating and drying polymeric primary particles obtained by emulsion polymerization.

The content of the PTFE is 0.05 to 3.0 wt % based on the total weight of the heat-fusible fluororesin and the PTFE. If the PTFE content is in the range of 0.05 to 3.0 wt %, rupture, cracking, or burst does not occur during diameter expansion. The resulting tube is excellent in peelability, can be peeled easily by hand, and has a heat shrinkage rate of 40% or more and high work efficiency. The PTFE content is more preferably 0.2 to 1.0 wt %, because the resulting tube is excellent in peelability, and has a heat shrinkage rate of 40% or more, preferably 50% or more, demonstrating high work efficiency; that is, the tube is excellent in both of peelability and heat shrinkage.

The method of mixing the at least two fluororesins, in preparation for forming them into a tubular shape, can be selected appropriately from the publicly known methods. Its examples will be shown below.

The examples of the mixing method include a method of premixing dispersions of the at least two fluororesins for coaggregation; a method of premixing the at least wo fluororesins each in powdery form; and a method of further melt-mixing a fluororesin mixture, which has been obtained by premixing, to obtain a material in the form of pellets.

The method of premixing the at least two fluororesins may be a publicly known method such as dry mixing or wet mixing. For example, the premixing can be performed using a publicly known dispersing or mixing machine such as a planetary mixer, a high speed impeller stirring machine, a rotary drum mixer, a screw mixer, a belt conveyor mixer, a ball mill, a pebble mill, a sand mill, a roll mill, an attritor, a bead mill, or a compounding extruder. A device capable of uniform dispersion is more preferred.

The forms of the fluororesins for use in mixing are not limited. However, a dispersion of fine particles having a particle size of 0.05 to 1 μm, a powdery material measuring several micrometers to several tens of micrometers, granules of a powdery material measuring several hundred micrometers, or pellets can be named in consideration of work efficiency.

The form of the mixture of the at least two fluororesins is, for example, a powdery material, granules of a powdery material, particles, flakes, or pellets. The average particle size of the resulting composition is 0.1 μm or more, and is preferably in such a range as not to impair handleability.

Usable as a method for obtaining the pellet-shaped material is a publicly known method, for example, comprising melt-extruding the composition by means of a single screw or twin-screw extruder to form a strand (string-shaped material), then cooling the strand, and cutting it into predetermined lengths to form pellets.

Cutting into the predetermined lengths can be performed using a publicly known method such as strand cutting, hot cutting, or underwater cutting. The average particle size of the pellet-shaped material is 0.1 mm or more, and is preferably in such a range as not to impair handleability.

The mixing method is not limited to those mentioned above, and a preferred method for obtaining more stable peelability over a continuous length is used.

(Method for Forming Heat Shrink Tube)

Next, an example of the method for melt-extruding the heat shrink tube of the present invention will be shown.

The powdery mixture composed of at least one of the fluororesins or the pellet-shaped fluororesin mixture, prepared in advance, is melt-extruded into a tubular form. On this occasion, the melt extrusion is performed so as to fulfill the aforementioned determination coefficient.

The melt forming (melt extrusion) refers to a forming method using a publicly known melt-forming apparatus. With this method, the material is fluidized in a molten state, whereby the melt can be converted into a formed product having sufficient strength and durability suitable for a predetermined purpose, such as a film, fibers, or a tube.

In order for the determination coefficient calculated from the [Equation 1] to satisfy a value exceeding 0.00, but equal to or less than 0.90, among the aforementioned regions, (A) Region of less than 30% from the interior of the tube, (B) Region of 30% or more, but less than 70%, from the interior of the tube, and (C) Region of 70% or more from the interior of the tube, in the tube after melt extrusion, it is necessary to render the states of the region (A) and the region (C) nearly homogeneous, and render the state of the region (B) different in nature from those of the regions (A) and (C).

To render the states of the region (A) and the region (C) nearly homogeneous, it is preferred to make the cooling conditions for the inner peripheral surface of the tube and the cooling conditions for the outer peripheral surface of the tube approximate to each other, when cooling the tube after melt extrusion. Normally, however, the cooling rate of the outer peripheral surface of the tube exposed to the outside air is faster than that of the inner peripheral surface of the tube presenting a closed space. In the tube after melt extrusion, therefore, the region (A) and the region (C) tend to be in heterogeneous states.

With the present invention, in order to bring the states of the region (A) and the region (C) into practical homogeneity, it is preferred to use a cooling rate reducing means, which reduces the difference between the cooling rate of the inner peripheral surface and the cooling rate of the outer peripheral surface, during the melt extrusion of the tube.

An example of the cooling rate reducing means is to introduce into the tube at least one of a temperature-controlled gas, for example, air, or an inert gas such as a nitrogen gas, and a liquid such as water, during melt extrusion. The use of the cooling rate reducing means during melt extrusion reduces the difference between the cooling conditions for the inner peripheral surface of the tube and the cooling conditions for the outer peripheral surface of the tube, thereby making the states of the region (A) and the region (C) nearly homogeneous in the tube after melt extrusion.

The region (B), which is not directly exposed to the outside air temperature, is cooled more mildly than the regions (A), (C). Thus, its state is different in nature from the states of the regions (A), (C), with the result that the determination coefficient can be controlled to the predetermined range.

As the cooling rate reducing means, other means than mentioned above may be adopted, if they contribute to the reduction of the difference in the cooling conditions for the region (A) and the region (C).

For example, a method which comprises contacting the inner peripheral surface of the tube with a water-cooled cylindrical mold immediately after melt extrusion, thereby promoting the cooling of the inner peripheral surface of the tube, can be employed favorably.

Moreover, if the outside air temperature is unstable, or is so high or low as to exert an adverse influence on the control of the determination coefficient, a measure for controlling the cooling rate of the outer peripheral surface of the tube, for example, by allowing the tube after melt extrusion to pass through a constant temperature bath, may also be used.

The formed tube is heated and internally pressurized for diameter expansion, whereby it is turned into the heat shrink tube according to the present invention.

A diameter expansion rate E is represented by the following [Equation 2]:

$$E\ (\%) = (L-L_0)/L_0 \times 100 \qquad \text{[Equation 2]}$$

where $L_0$: inner diameter of melt-extruded tube $L$: inner diameter of tube after diameter expansion The value of the diameter expansion rate E is not particularly limited, but correlates with the heat shrinkage rate, and an increase in the diameter expansion rate contributes to an increase in the work efficiency. If the increase is too great, however, rupture, cracking, or burst tends to occur during diameter expansion. Thus, a diameter expansion rate of 50 to 210% can be said to be a preferred range.

However, the present invention has the region (B) which is higher in elastic modulus (harder) than the regions (A), (C). Hence, there is room for a greater diameter expansion rate and, if the strength of the fluororesin is taken into consideration, a diameter expansion rate of up to 210% or so can be achieved. Thus, the heat shrink tube of the present invention can gain a greater shrinkage rate.

The heat shrinkage rate S is represented by the following [Equation 3]. The heat shrinkage rate S is preferably 40% or more, more preferably 50% or higher.

$$S\ (\%) = (P-Q)/P \times 100 \qquad \text{[Equation 3]}$$

where

P: inner diameter of tube after diameter expansion

Q: inner diameter of tube after shrinkage

As the heat shrinkage rate S increases, sufficient clamping by the heat shrink tube is obtained. Thus, excellent workability results, so that the tube can be put to every use. As the tube is shrunk at a higher temperature, the shrinkage rate becomes greater. To obtain a greater shrinkage rate, therefore, a method of shrinking the tube at a high temperature in a short time is also available. In this case, the shrinking temperature needs to be determined in consideration of the heat resistance of the material to be coated.

The heat shrink tube of the present invention is characterized in that it retains a high thermal (heat) shrinkage rate, namely, a high work efficiency, and excels in contradictory properties, i.e., peelability.

The melt extrusion method for the heat shrink tube of the present invention provides a drawdown ratio (DDR), as calculated from the following [Equation 4], of 10 to 500, preferably 20 to 300, more preferably 20 to 200.

$$DDR=(D_D^2-D_T^2)/(D_o^2-D_r^2) \qquad \text{[Equation 4]}$$

where $D_D$: inner diameter of die
$D_T$: outer diameter of mandrel
$D_o$: outer diameter of tube
$D_r$: inner diameter of tube As the drawdown ratio increases, the resulting tube is better in peelability.

The heat shrink tube of the present invention is excellent in both of peelability and heat shrinkage rate, and also excels in transparency. Thus, it is useful in foods, medicine, pharmaceutics, chemistry, analytical instruments, and any other technical field. The tube is particularly useful for uses in which electric wires, tubes, etc. having a multilayer structure including a protective layer for a blade or the like, or having a heteromorphic structure, are shrink-coated with the heat shrink tube, and interior members are molded or heat-welded, whereafter the heat shrink tube is removed.

EXAMPLES

The present invention will now be described in more detail by way of concrete examples, but is not limited at all by these examples.

The measuring methods are as described below.

(1) Nanoindentation Measurements

Using a measuring device (TI-950 Tribo Indenter, produced by Hysitron, Inc.) with an indenter of the Berkovich type under the following measurement conditions, room temperature as a measuring temperature, a maximum indentation force of 1,000 μN, an indentation speed of 200 μN/sec, a full load application time of 1.0 second, and an unloading speed of 200 μN/sec, static nanoindentation measurements were performed to obtain an elastic modulus. The points of measurements were separated by a distance equal to or more than 3 times the diameter of a dent.

(2) Peel Strength

A 50 mm notch was provided near the center of the diameter at one end of a measurement sample measuring 150 mm, and bifurcated notched parts were held by chucks (fixing jigs) of a tensile tester.

The notched parts of the measurement samples were peeled by 70 mm at a tension speed of 200 mm/min, and maximum strength under these conditions was measured. The weighted average value of the measurements (n=5) was used as peel strength.

(3) Peelability

Peel strength was measured by the above-mentioned method, and peelability was evaluated on the following criteria:

◎: Peelable by hand rectilinearly with ease.
○: Peelable by hand, but over a rectilinearly shorter distance than for ◎ above.

(4) Transparency (Transmittance)

Measured in accordance with ASTM D1746 using a commercially available transparency measuring instrument.

Example 1

FEP (Teflon (registered trademark) FEP100-J, produced by Chemours-Mitsui Fluoroproducts Co., Ltd., MFR 7 g/10 min, melting point 260° C.) comprising two monomers (TFE and HFP) was used as a heat-fusible fluororesin. A PTFE powder (melting point 336° C.) lacking a heat history of the melting point thereof or higher after polymerization and having a specific gravity of 2.20 was mixed in an amount of 0.4 wt % with the heat-fusible resin. The resulting mixture was formed into pellets at a molding temperature of 300° C. (a temperature lower than the melting point of PTFE). The pellets were melt-extruded (DDR=100) in the form of a tube at a forming temperature of 320° C. (a temperature lower than the melting point of PTFE) by means of a melt extruder. The resulting tube was 0.35 mm in inner diameter and 1.00 mm in outer diameter. The forming temperature represents the temperature of the molten resin within the melt extruder.

The melt extruder was equipped with a mechanism for introducing temperature-controlled air into the tube being melt-extruded. During melt extrusion, air controlled to the outside air temperature±3° C. (20±3° C.) was introduced into the tube to reduce the difference between the cooling rate of the inner peripheral surface of the tube and the cooling rate of the outer peripheral surface of the tube.

Compressed air was poured into the resulting tube by an expansion means to expand the tube maximally to such a degree as not to cause breakage. Then, the size of the tube was measured to calculate the rate of diameter expansion. Then, the tube was heated for 10 min at 260° C. for thermal shrinkage, whereby a tube for measurement was obtained.

Figure 4:
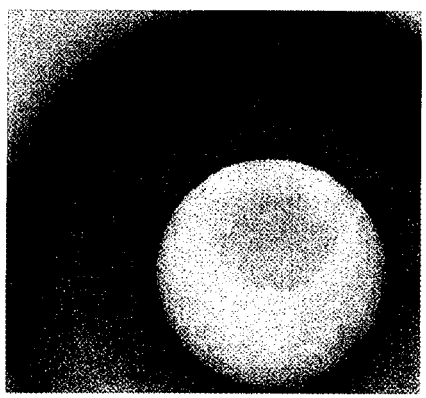
FIG. 4 is an optical microscope image of a cross-section of the heat shrink tube of Example 1.

A cross-section of the resulting tube perpendicular to the extrusion direction of the tube was mirror-polished until its surface roughness (Ra) became 0.05 μm or less. Then, a determination coefficient was calculated by the aforementioned [Equation 1] using an elastic modulus ratio (%) obtained by measuring, on a straight line passing through the aforementioned regions (A), (B) and (C), the elastic moduli at any three points in each region, provided that the wall thickness of the tube at the cross-section was 100%, the elastic modulus ratio (%) being the ratio of the average value of the elastic moduli in each region and the average value of the elastic moduli in all the regions. The results are shown in FIG. 1, and an optical microscope image of this cross-section is shown in FIG. 4. Moreover, the peelability, transparency, diameter expansion rate, heat shrinkage rate, and peel strength of the measurement tube are shown in Table 1.

Example 2

Figure 2:
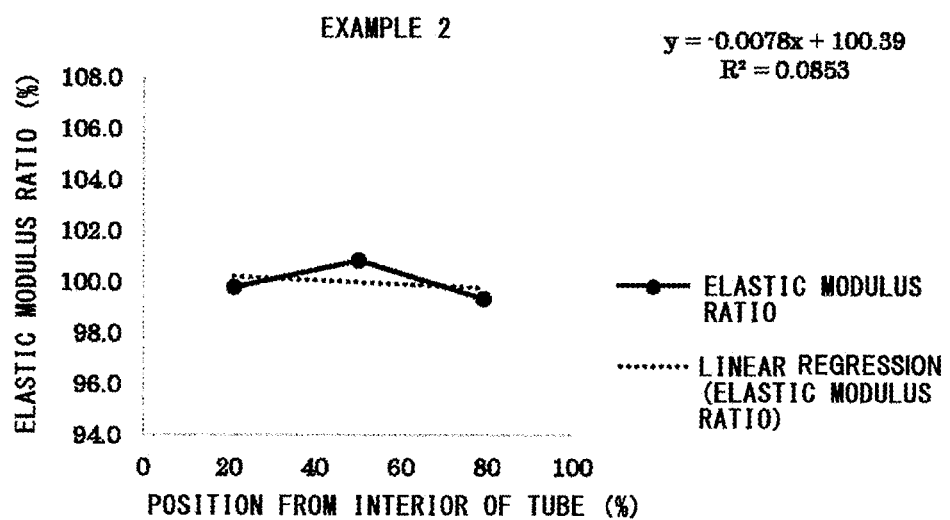
FIG. 2 is a view for finding a determination coefficient from the relation between the position (%) from the interior of a heat shrink tube, obtained in Example 2, and the elastic modulus ratio (%).

A measurement tube was obtained in the same manner as in Example 1, except that heat shrinkage was not performed. Then, its determination coefficient was calculated. The results are shown in FIG. 2. Moreover, the peelability, transparency, diameter expansion rate, and peel strength of the measurement tube are shown in Table 1.

Comparative Example 1

Figure 3:
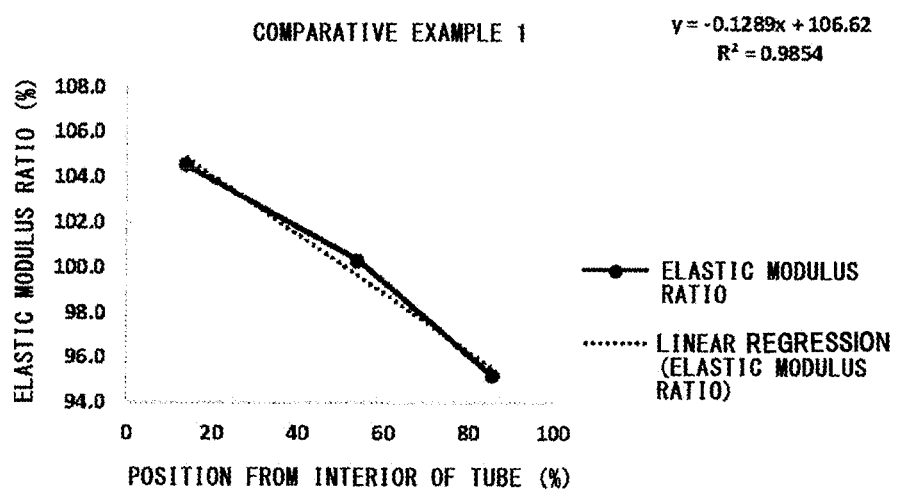
FIG. 3 is a view for finding a determination coefficient from the relation between the position (%) from the interior of a tube, obtained in Comparative Example 1, and the elastic modulus ratio (%).

A measurement tube was obtained in the same manner as in Example 1, except that the difference between the cooling rate of the inner peripheral surface of the tube and the cooling rate of the outer peripheral surface of the tube was not reduced. Then, its determination coefficient was calculated. The results are shown in FIG. 3. Moreover, the peelability, transparency, diameter expansion rate, heat shrinkage rate, and peel strength of the measurement tube are shown in Table 1.

TABLE 1

|  | | PTFE content [wt %] | Peelability | Determination coefficient | Transparency [%] | Diameter Expansion rate [%] | Heat shrinkage rate [%] | Peel strength [N] |
|---|---|---|---|---|---|---|---|---|
| Example | 1 | 0.4 | ◉ | 0.3237 | ≥80 | 208 | 59 | 4.5 |
|  | 2 | 0.4 | ◉ | 0.0853 | ≥80 | 208 | — | 4.1 |
| Comparative Example | 1 | 0.4 | ○ | 0.9854 | ≥80 | 208 | 57 | 4.7 |

The heat shrink tubes of Examples 1 and 2 according to the present invention are easily peelable rectilinearly by hand, are both excellent in peelability, and have a high thermal (heat) shrinkage rate. Thus, they excel in work efficiency.

The heat shrink tube of Comparative Example 1, on the other hand, has a determination coefficient close to 1.00, and its elastic modulus changes gradiently. Thus, it can be peeled manually, but is not easily peelable rectilinearly, and can be found to be inferior in peelability to Example 1.

In addition, the heat shrink tube of Comparative Example 1, if given the same diameter expansion rate as that of Examples 1 and 2, cannot have its diameter expanded uniformly, because its elastic modulus in the region (B) is low. As a result, its shrinkage behavior during heat shrinkage is unstable. Although its heat shrinkage rate is nearly equal to that of Example 1, therefore, the tube of Comparative Example 1 cannot become a uniformly heat-shrunk tube comparable to Example 1.

As noted above, the heat shrink tube according to the present invention is found to be a heat shrink tube, which ensures a sufficient heat shrinkage rate, while possessing excellent diameter expansion strength and peelability, thus excels in both of peelability and heat shrinkage rate, and is also excellent in transparency, as compared with the conventional technologies.

INDUSTRIAL APPLICABILITY

The heat shrink tube of the present invention is excellent in both of the characteristics, peelability and heat shrinkage rate, and also excels in transparency. Thus, it is useful in foods, medicine, pharmaceutics, chemistry, analytical instruments, and any other technical field.

The invention claimed is:

1. A peelable heat shrink tube composed of a fluororesin, wherein the fluororesin is a copolymer melting at a temperature equal to or higher than a melting point to show fluidity, and is a copolymer of an unsaturated fluorinated hydrocarbon, an unsaturated fluorinated chlorinated hydrocarbon, or an ether group-containing unsaturated fluorinated hydrocarbon, or is at least one copolymer selected from copolymers of these unsaturated fluorinated hydrocarbons and ethylene,
wherein the peelable heat shrink tube has a peel strength of 10 N or less, wherein the peel strength is measured by providing a 50 mm notch near the center of the diameter at one end of a measurement sample measuring 150 mm, holding the measurement sample by chucks of a tensile tester, peeling the measurement sample by 70 mm at a tension speed of 200 mm/min, and measuring a maximum strength,
wherein a determination coefficient calculated from [Equation 1] below using an elastic modulus ratio (%) is more than 0.00, but 0.90 or less, the elastic modulus ratio (%) being obtained by measuring, on a straight line passing through regions (A), (B) and (C) below, elastic moduli of at least three points freely selected from each region, provided that a wall thickness of the tube at a cross-section perpendicular to an extrusion direction of the tube is 100%, the elastic modulus ratio (%) being a ratio of an average value of the elastic moduli in each region and an average value of the elastic moduli in all the regions,
(A) Region of less than 30% from an interior of the tube
(B) Region of 30% or more, but less than 70%, from the interior of the tube
(C) Region of 70% or more from the interior of the tube $$\text{Determination coefficient} = (\text{correlation coefficient})^2 = \left[\frac{(\text{covariance})}{(\text{standard deviation of } X)(\text{standard deviation of } Y)}\right]^2 \quad [\text{Equation 1}]$$

where X, Y and covariance represent the following:
X: Proportion of a position of each point, where the elastic modulus was measured, from the interior of the tube
Y: Elastic modulus ratio in each region
Covariance: Average of a product of deviations of X and Y,
wherein the elastic modulus is measured by performing static nanoindentation measurements with points of measurements separated by a distance equal to or more than 3 times a diameter of a dent, and by using a measuring device with an indenter of the Berkovich type under the following measurement conditions:
room temperature as a measuring temperature,
a maximum indentation force of 1,000 μN,
an indentation speed of 200 μN/sec, a full load application time of 1.0 second, and an unloading speed of 200 μN/sec.

2. A peelable heat shrink tube composed of a fluororesin, wherein the fluororesin is a copolymer of tetrafluoroethylene and at least one monomer selected from hexafluoropropylene, fluoroalkoxytrifluoroethylene, chlorotrifluoroethylene, vinylidene fluoride and vinyl fluoride, or is at least one copolymer selected from copolymers of these monomers and ethylene,
wherein the peelable heat shrink tube has a peel strength of 10 N or less, wherein the peel strength is measured by providing a 50 mm notch near the center of the diameter at one end of a measurement sample measuring 150 mm, holding the measurement sample by chucks of a tensile tester, peeling the measurement sample by 70 mm at a tension speed of 200 mm/min, and measuring a maximum strength,
wherein a determination coefficient calculated from [Equation 1] below using an elastic modulus ratio (%) is more than 0.00, but 0.90 or less, the elastic modulus ratio (%) being obtained by measuring, on a straight line passing through regions (A), (B) and (C) below, elastic moduli of at least three points freely selected from each region, provided that a wall thickness of the tube at a cross-section perpendicular to an extrusion direction of the tube is 100%, the elastic modulus ratio (%) being a ratio of an average value of the elastic moduli in each region and an average value of the elastic moduli in all the regions, (A) Region of less than 30% from an interior of the tube
(B) Region of 30% or more, but less than 70%, from the interior of the tube
(C) Region of 70% or more from the interior of the tube $$\text{Determination coefficient} = (\text{correlation coefficient})^2 = \left[\frac{(\text{covariance})}{(\text{standard deviation of } X)(\text{standard deviation of } Y)}\right]^2 \quad \text{[Equation 1]}$$

where X, Y and covariance represent the following:
   X: Proportion of a position of each point, where the elastic modulus was measured, from the interior of the tube
   Y: Elastic modulus ratio in each region
   Covariance: Average of a product of deviations of X and Y,
   wherein the elastic modulus is measured by performing static nanoindentation measurements with points of measurements separated by a distance equal to or more than 3 times a diameter of a dent, and by using a measuring device with an indenter of the Berkovich type under the following measurement conditions:
      room temperature as a measuring temperature,
      a maximum indentation force of 1,000 µN,
      an indentation speed of 200 µN/sec, a full load application time of 1.0 second, and an unloading speed of 200 µN/sec.

3. A peelable heat shrink tube composed of a fluororesin, wherein the fluororesin is at least one copolymer selected from tetrafluoroethylene-hexafluoropropylene copolymer (FEP), tetrafluoroethylene-perfluoroalkyl vinyl ether copolymer (PFA), tetrafluoroethylene-ethylene copolymer (ETFE), tetrafluoroethylene-hexafluoropropylene-vinylidene fluoride copolymer (THV), and polyvinylidene fluoride-polyvinylidene difluoride (PVDF),
wherein the peelable heat shrink tube has a peel strength of 10 N or less, wherein the peel strength is measured by providing a 50 mm notch near the center of the diameter at one end of a measurement sample measuring 150 mm, holding the measurement sample by chucks of a tensile tester, peeling the measurement sample by 70 mm at a tension speed of 200 mm/min, and measuring a maximum strength,
wherein a determination coefficient calculated from [Equation 1] below using an elastic modulus ratio (%) is more than 0.00, but 0.90 or less, the elastic modulus ratio (%) being obtained by measuring, on a straight line passing through regions (A), (B) and (C) below, elastic moduli of at least three points freely selected from each region, provided that a wall thickness of the tube at a cross-section perpendicular to an extrusion direction of the tube is 100%, the elastic modulus ratio (%) being a ratio of an average value of the elastic moduli in each region and an average value of the elastic moduli in all the regions, (A) Region of less than 30% from an interior of the tube
(B) Region of 30% or more, but less than 70%, from the interior of the tube
(C) Region of 70% or more from the interior of the tube $$\text{Determination coefficient} = (\text{correlation coefficient})^2 = \left[\frac{(\text{covariance})}{(\text{standard deviation of } X)(\text{standard deviation of } Y)}\right]^2 \quad \text{[Equation 1]}$$

where X, Y and covariance represent the following:
   X: Proportion of a position of each point, where the elastic modulus was measured, from the interior of the tube
   Y: Elastic modulus ratio in each region
   Covariance: Average of a product of deviations of X and Y,
   wherein the elastic modulus is measured by performing static nanoindentation measurements with points of measurements separated by a distance equal to or more than 3 times a diameter of a dent, and by using a measuring device with an indenter of the Berkovich type under the following measurement conditions:
      room temperature as a measuring temperature,
      a maximum indentation force of 1,000 µN,
      an indentation speed of 200 µN/sec, a full load application time of 1.0 second, and an unloading speed of 200 µN/sec.

4. A method of forming the peelable heat shrink tube of claim 1, comprising subjecting the fluororesin to melt extrusion to form the peelable heat shrink tube, wherein
   the melt extrusion is performed using a melt extruder equipped with a cooling rate reducing means for reducing a difference between a cooling rate of an inner peripheral surface of the tube being melt-extruded and a cooling rate of an outer peripheral surface of the tube.

5. The method according to claim 4, wherein
   the cooling rate reducing means is provided with a mechanism for introducing at least one substance, selected from a temperature controlled gas and a liquid, into the tube being melt-extruded by the melt extruder so that at least one of the temperature controlled gas and the liquid is introduced into the tube during the melt extrusion.

6. The method according to claim 5, wherein
   the temperature controlled gas is at least one gas selected from air and a nitrogen gas, and
   the liquid is water.

7. A method of forming the peelable heat shrink tube of claim 2, comprising subjecting the fluororesin to melt extrusion to form the peelable heat shrink tube, wherein
   the melt extrusion is performed using a melt extruder equipped with a cooling rate reducing means for reducing a difference between a cooling rate of an inner peripheral surface of the tube being melt-extruded and a cooling rate of an outer peripheral surface of the tube.

8. The method according to claim 7, wherein
   the cooling rate reducing means is provided with a mechanism for introducing at least one substance, selected from a temperature controlled gas and a liquid, into the tube being melt-extruded by the melt extruder so that at least one of the temperature controlled gas and the liquid is introduced into the tube during the melt extrusion.

9. The method according to claim 8, wherein
the temperature controlled gas is at least one gas selected from air and a nitrogen gas, and
the liquid is water.

10. A method of forming the peelable heat shrink tube of claim 3, comprising subjecting the fluororesin to melt extrusion to form the peelable heat shrink tube, wherein
the melt extrusion is performed using a melt extruder equipped with a cooling rate reducing means for reducing a difference between a cooling rate of an inner peripheral surface of the tube being melt-extruded and a cooling rate of an outer peripheral surface of the tube.

11. The method according to claim 10, wherein
the cooling rate reducing means is provided with a mechanism for introducing at least one substance, selected from a temperature controlled gas and a liquid, into the tube being melt-extruded by the melt extruder so that at least one of the temperature controlled gas and the liquid is introduced into the tube during the melt extrusion.

12. The method according to claim 11, wherein
the temperature controlled gas is at least one gas selected from air and a nitrogen gas, and
the liquid is water.

* * * * *